March 27, 1934. E. P. MULLAN 1,952,771
PROCESS FOR THE SEPARATION OF COLOR AREAS WHEN AREAS OF
MORE THAN ONE COLOR ARE CONTAINED IN A SINGLE
PHOTOGRAPHIC OR MECHANICAL NEGATIVE
Filed June 25, 1932
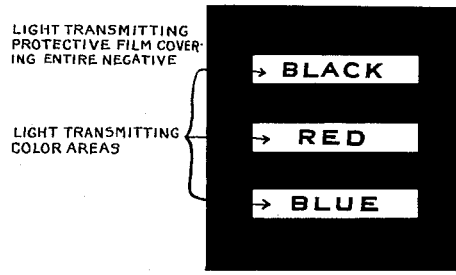
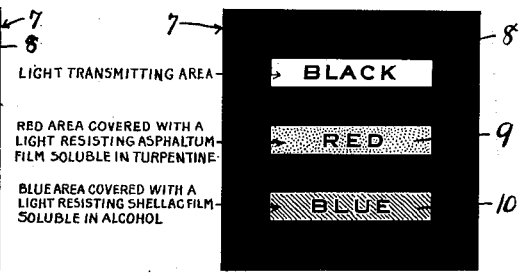
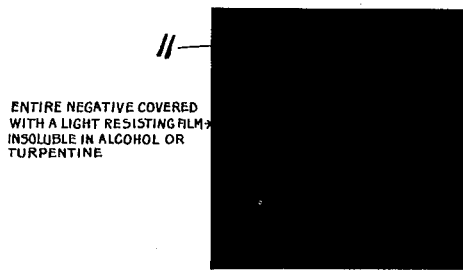
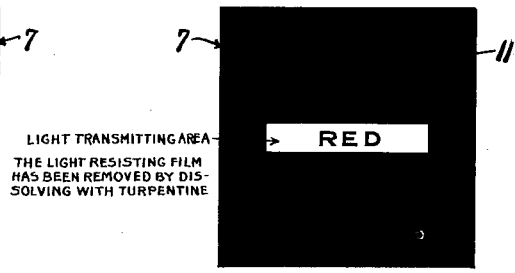
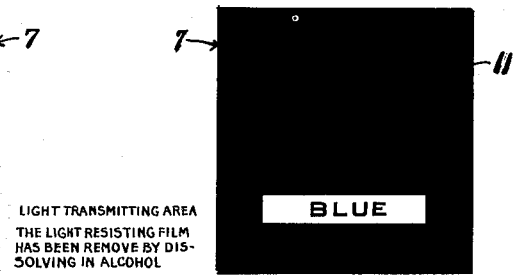
INVENTOR.
Edward P. Mullan
BY
W. W. Williamson
ATTORNEY.

Patented Mar. 27, 1934

1,952,771

UNITED STATES PATENT OFFICE 1,952,771

PROCESS FOR THE SEPARATION OF COLOR AREAS WHEN AREAS OF MORE THAN ONE COLOR ARE CONTAINED IN A SINGLE PHOTOGRAPHIC OR MECHANICAL NEGATIVE

Edward P. Mullan, Bala, Pa.

Application June 25, 1932, Serial No. 619,218

8 Claims. (Cl. 95—2)

My invention relates to new and useful improvements in a process for the separation of color areas when areas of more than one color are contained in a single photographic or mechanical negative, and has for one of its objects the provision of a process for use in photomechanical printing wherein the different colors may be successively separated from all others in a single photographic or mechanical negative.

A further object of the invention is to provide a process by which each of a number of color areas may be separated from the others in successive operations and used for printing purposes.

Another object of the invention is to provide a process wherein articles may be printed in several colors at a considerable saving in time and expense and in which the different colors will properly register.

Fig. 1 is a view of a negative containing areas to be reproduced in various colors herein shown as three in number and designated as black, red and blue. All of the areas are represented as clear or light transmitting.

Fig. 2 is a view of the same negative showing the red and blue areas covered with soluble light resisting coating, while the black area is shown as clear and light transmitting.

Fig. 3 is a view showing the entire negative covered with a light resisting film.

Fig. 4 is a view showing the red area exposed and light transmitting due to the removal of the soluble light resisting coating which covered area, while the black and blue areas remain covered and light resisting.

Fig. 5 is a view showing the negative again covered with a light resisting film similar to Fig. 3.

Fig. 6 is a view illustrating the blue area exposed and light transmitting due to the removal of the light resisting coating in the region of or which covered said blue area while the red and black areas are covered up and remain light resisting.

Road maps are generally printed in two or three colors. The unimproved and least travelled roads and the town names are printed in black. The main travelled roads and improved highways are printed in red. Rivers, lakes and coast lines are printed in blue. A road map of this character requires in the printing, three printing plates; a black plate, a red plate and a blue plate. The black printing plate contains the unimproved and least travelled roads and the town names. This plate when printed in black ink produces upon the printed sheet all of the details of the map that appear in black. The red plate contains all the improved and main travelled roads. This plate when printed in red ink, produces upon the printed sheet all the details that are to appear upon the map in red. The blue plate contains all the rivers, lakes, and coast lines. This plate when printed in blue ink produces upon the printed sheet all the details that are to appear upon the map in blue.

All the colored details of the map, black, red and blue, must when printed upon a single sheet, register or fit perfectly together. To achieve this perfection of register, the three printing plates are usually produced by photographically printing through a single negative, upon a sensitized metal plate.

This negative is generally made photographically from a large drawing or base map. This large drawing or base may contain all the details of the map; black, red and blue.

Before the printing plates can be made with this single negative it is necessary to employ some method to separate the colored details contained therein. To produce a black plate all the details of red, and blue must be covered with an opaque medium. The print is then made photographically upon the metal plate. The red and blue details being covered with the opaque substance, only the black details that are left clear or light transmitting can print upon the metal plate. The red plate is produced by covering the black and blue details with the opaque medium and then photographically printing through the negative upon a sensitized metal plate. The blue plate is produced by covering all the black and red details and then printing through the negative upon a sensitized metal plate.

The method heretofore used to separate the colored details contained in a single negative consists of covering by hand painting with an opaque medium all the details of red and blue and then photographically printing through the negative upon a sensitized metal sheet in order to produce the black printing plate. The opaque medium is then removed from the negative, leaving the negative in its original condition with all the details, black, red and blue showing clear and light transmitting. The black and blue details are now covered with the opaque medium and the red plate is produced by the same photographic method described for the black plate. The opaque substance is again removed from the negative leaving it once more in the original condition with all the details, black, red and blue showing clear and light transmitting. The blue plate is produced by covering the black and red details with the opaque medium and photographically printing as described for the black and red plates.

This method of color separation consists of three hand painting operations and two operations to remove the opaque medium. It is very laborious and time consuming.

A great amount of the time is consumed in finding the various color details contained in the negative. The red roads are easily found. They are wider and less numerous than the black roads. The rivers have a character that makes their discernment easy. If these two colors are covered with the opaque medium, the black details are left uncovered and are readily seen. The method heretofore used destroys this advantage, for in that method the opaque medium is removed from the negative after each printing operation making it necessary to search out each color without having the former covering of opaque medium to assist in the finding of the remaining colors.

It is the object of my process to eliminate one of the hand painting operations and to perform the remaining two hand painting operations together thus making all details easy to find, to considerably reduce the time required for the hand operations, to eliminate the necessity for the removal or destruction of the two hand painting operations and finally it is my object to make the operations necessary to produce the second and third separations, merely mechanical developments.

In carrying out my process if the map is to be made in two colors, for example, black and red. The red roads and other red details on the negative are covered with a light resisting substance composed of asphaltum dissolved in turpentine. This coating of asphaltum is applied with a small sable hair brush. When this light resisting film is thoroughly dry, a print is made photographically through the negative upon a sensitized metal plate. The negative is then flowed or sprayed with a light resisting medium made of carbon black and gum arabic. When this light resisting film is thoroughly dry the negative is gently rubbed with a wad of absorbent cotton soaked in turpentine. This operation removes the light resisting covering of asphaltum, together with its covering of the carbon black film, thus exposing the red roads, etc. The black details remaining covered with the carbon light resisting substance.

If the map is to be made in three colors, for example, black, red and blue, as shown in the drawing herewith, the negative 7 is flowed or sprayed with a light transmitting solution 8 made by dissolving gum arabic in water. The red details of the map are now covered on the negative with a light resisting substance 9 composed of asphaltum dissolved in turpentine. When this light resisting coating which is applied with a small brush, is thoroughly dry, the blue details of the map are painted over on the negative with a light resisting solution 10 composed of shellac dissolved in alcohol and colored with eosine red or a bright orange dye. The black plate is now made by photographically printing through the negative upon a sensitized metal plate. The negative is now flowed or sprayed with a solution 11, Fig. 3, of carbon black and gum arabic. When this light resisting coating is thoroughly dry, the negative is gently rubbed with a wad of absorbent cotton soaked with turpentine. This removes the asphalt light resisting medium 9 together with its covering of the carbon black light resisting film 11 and exposes the red details of the map, as in Fig. 4. All other details of the map remain covered with the light resisting carbon black film 11. The red printing plate is now made photographically in the same manner as described for the black plate. The negative is again flowed or sprayed with the carbon black solution 11, as in Fig. 5, and when thoroughly dry the negative is gently rubbed with a wad of absorbent cotton soaked in alcohol. This removes the colored shellac light resisting coating 10 together with its covering of the carbon black light resisting film 11, thus exposing on the negative the blue details of the map, as shown in Fig. 6. All the other details remain covered with the carbon black light resisting film 11. The blue printing plate is now made in the same manner as described for the black plate.

The method may be used for labels or wherever color details may be separated upon a single negative.

I claim:—

1. A process for the separation of color areas when areas of more than one color are contained in a single photographic or mechanical negative, consisting of producing a film of a light resisting substance upon selected areas upon the surface of the negative, then making a print photographically through the negative upon a sensitive medium, then producing a light resisting film upon the remaining surface of the negative and upon the light resisting film produced upon the selected areas, then removing the light resisting films from selected areas by means which will not effect the second light resisting film, and then again making a photographic print through the negative upon a sensitive medium.

2. A process for the separation of color areas when areas of more than one color are contained in a single photographic or mechanical negative, consisting of producing a soluble light resisting film upon selected areas upon the surface of the negative, then printing photographically through the negative upon a sensitive medium, then producing a light resisting film upon the remaining areas upon the surface of the negative and upon the light resisting film produced upon the selected areas and then removing the soluble light resisting film with a solvent which will attack the first mentioned film without effecting the other film, then making a print photographically through the negative upon a sensitive medium.

3. A process for the separation of color areas when areas of more than one color are contained in a single photographic or mechanical negative, consisting of producing a light resisting film upon selected areas upon the surface of the negative, said film being of a character to permit its removal by using a selected solvent for the purpose, then making a print photographically through the negative upon a sensitive medium, then producing a light resisting film upon the remaining areas upon the surface of the negative and upon the light resisting film covering the selected areas, said light resisting film being insoluble in the selected solvent, then removing the light resisting films from the selected areas, using the selected solvent for the purpose, then making a print photographically through the negative upon a sensitive medium.

4. A process for the separation of color areas when areas of more than one color are contained in a single photographic or mechanical negative, consisting of producing upon the surface of the negative a light transmitting film that is insoluble in two selected solvents, then producing upon selected areas upon the surface of the negative, a light resisting film, said light resisting film being of a character permitting its removal with one of the two selected solvents, then producing upon further selected areas upon the surface of the negative, a light resisting film of a character permitting its removal with the remaining selected solvent, then making a print protographically through the negative upon a sensitive medium, then producing a light resisting film upon the remaining areas upon the surface of the negatives, and upon the light resisting film covering the selected areas, then removing the light resisting films upon the first mentioned selected areas using the solvent selected for the purpose, then making a print photographically through the negative upon a sensitive medium, then producing a light resisting film upon all the areas upon the surface of the negative, the said light resisting film being insoluble in the remaining selected solvent, then removing the light resisting film from the areas further selected, using the solvent selected for the purpose, then again making a print photographically through the negative upon a sensitive medium.

5. A process for the separation of color areas when areas of more than one color are contained in a single photographic or mechanical negative, consisting of forming a light transmitting film upon the surface of the negative, said film being insoluble in three selected solvents, then forming a light resisting film upon selected areas, said light resisting film being of a character that permits its removal with the first of the three selected solvents, then forming a light resisting film upon further selected areas, this light resisting film being of a character permitting its removal with the second of the selected solvents, then forming a light resisting film upon still further selected areas, this light resisting film being of a character permitting its removal with the third of the three selected solvents, then making a print photographically through the negative upon a sensitive medium, then forming a light resisting film upon all the areas, this film being insoluble in the selected solvents, then removing the light resisting film formed upon the first of the selected areas using the solvent selected for the purpose, then making a print photographically through the negative upon a sensitive medium, then forming a light resisting film upon all the areas of the negative, then removing the light resisting film from the second selected areas, using the solvent selected for the purpose, then making a print photographically through upon a sensitive medium, then again forming a light resisting film upon all the areas, then removing the light resisting film from the remaining or third selected areas, using the third selected solvent for the purpose, then making a final print photographically through the negative upon a sensitive medium.

6. A process for the separation of color areas when areas of more than one color are contained in a single negative, consisting of producing a film of a light resisting substance upon selected areas of the surface of the negative thereby leaving one area light transmitting, then making a photographic print through the negative upon a sensitive medium, then producing a light resisting film upon the light transmitting area as well as upon the first mentioned light resisting film, then successively removing the light resisting films from any other selected areas by means which will only attack those parts of the films to be removed without effecting the other parts of the films, to make, one at a time, each of said selected areas light transmitting, and making successive photographic prints through the different light transmitting areas upon sensitive mediums.

7. A process for the separation of color areas when areas of more than one color are contained in a single photographic or mechanical negative, consisting of producing a film of a light resisting substance upon selected areas upon the surface of the negative, then producing a light resisting film upon the remaining surface of the negative and upon the light resisting film produced upon the selected areas, then removing the light resisting films from the selected areas by means which will only attack those parts of the films to be removed without effecting the other parts thereof, and making a succession of protographic prints through the negative upon a sensitive medium.

8. A process for the separation of color areas when areas of more than one color are contained in a single photographic or mechanical negative, consisting of producing a light resisting film upon selected areas upon the surface of the negative, said film being of a character to permit its removal by using a selected solvent for the purpose, then producing a light resisting film upon the remaining areas upon the surface of the negative and upon the light resisting film covering the selected areas, said second light resisting film being insoluble in the selected solvent, then removing the light resisting films from the selected areas, using the selected solvent for the purpose, and making a succession of prints photographically through the negative upon a sensitive medium.

EDWARD P. MULLAN.